(12) United States Patent
Lowder et al.

(10) Patent No.: US 12,683,365 B2
(45) Date of Patent: Jul. 14, 2026

(54) MODULAR POWER DISTRIBUTION SYSTEM

(71) Applicant: Legrand AV Inc., Fairfield, NJ (US)

(72) Inventors: Scott Byerley Lowder, Orange, CT (US); Shane Christopher Roma, Tustin, CA (US); Anthony Philip Cullen, Ringwood, NJ (US); Leszek Markowski, Riverdale, NJ (US)

(73) Assignee: Legrand AV Inc., Fairfield, NJ (US)

( * ) Notice: Subject to any disclaimer, the term of this patent is extended or adjusted under 35 U.S.C. 154(b) by 498 days.

(21) Appl. No.: 18/175,183

(22) Filed: Feb. 27, 2023

(65) Prior Publication Data

US 2024/0291245 A1 Aug. 29, 2024

(51) Int. Cl.
| | |
|---|---|
| *H02B 1/32* | (2006.01) |
| *H02B 1/20* | (2006.01) |
| *H02G 3/00* | (2006.01) |
| *H02J 9/00* | (2006.01) |

(52) U.S. Cl.
CPC ................. *H02B 1/32* (2013.01); *H02B 1/20* (2013.01); *H02G 3/00* (2013.01); *H02J 9/00* (2013.01)

(58) Field of Classification Search
None
See application file for complete search history.

(56) References Cited

U.S. PATENT DOCUMENTS

| | | | | | |
|---|---|---|---|---|---|
| 6,121,695 | A | * | 9/2000 | Loh | H02J 9/062 |
| | | | | | 307/64 |
| 6,826,036 | B2 | | 11/2004 | Pereira | |
| 7,082,042 | B2 | | 7/2006 | Harris et al. | |
| 8,489,667 | B2 | | 7/2013 | Ewing et al. | |
| 8,754,546 | B2 | | 6/2014 | Arimilli et al. | |
| 9,000,721 | B2 | * | 4/2015 | Hernandez | B60L 53/30 |
| | | | | | 320/108 |
| 9,160,174 | B2 | | 10/2015 | Simper et al. | |
| 10,491,005 | B2 | | 11/2019 | Hall et al. | |
| 10,601,187 | B2 | | 3/2020 | Hewitt et al. | |
| 10,601,228 | B2 | | 3/2020 | Hall et al. | |
| 10,658,846 | B2 | | 5/2020 | Hall et al. | |
| 11,063,467 | B2 | | 7/2021 | Stevens et al. | |
| 11,183,851 | B1 | * | 11/2021 | Chen | H02H 3/105 |
| 11,203,267 | B2 | * | 12/2021 | Prasad | B60L 53/30 |

(Continued)

*Primary Examiner* — Courtney L Smith
(74) *Attorney, Agent, or Firm* — Faegre Drinker Biddle & Reath LLP

(57) ABSTRACT

A power distribution system is described. The system comprises connectable modules, including an input module and at least a first output module. The input module comprises a power input interface configured to receive alternating current power and direct current power from external sources, an output controller configured to generate control signals that control power delivery by the first output module, and an output module interface having i) a power output interface that provides AC power and DC power to the first output module, and ii) a control interface that provides the control signals to the first output module for controlling the power delivery. The first output module comprises an input module interface configured to engage the output module interface and receive the AC power and the DC power from the power output interface, and two or more outlets, each configured to deliver either the AC power or the DC power.

20 Claims, 4 Drawing Sheets

(56)                 References Cited

U.S. PATENT DOCUMENTS

| | | | | |
|---|---|---|---|---|
| 11,868,927 | B2 * | 1/2024 | Erikson | B60L 53/67 |
| 12,015,293 | B2 * | 6/2024 | Wang | H02M 3/33573 |
| 2013/0069588 | A1 * | 3/2013 | Oda | B60L 53/11 |
| | | | | 320/109 |
| 2019/0135116 | A1 * | 5/2019 | Narla | H02J 3/381 |
| 2019/0375308 | A1 * | 12/2019 | Vaughan | B60L 53/63 |
| 2020/0328586 | A1 | 10/2020 | Eriksen et al. | |
| 2022/0094189 | A1 * | 3/2022 | Sandahl | B60L 53/14 |
| 2022/0115884 | A1 * | 4/2022 | Wang | H02M 3/01 |
| 2023/0191936 | A1 * | 6/2023 | Erikson | B60L 53/62 |
| | | | | 320/109 |
| 2023/0208183 | A1 * | 6/2023 | Underhill | H02J 7/0042 |
| | | | | 307/23 |

* cited by examiner

MODULAR POWER DISTRIBUTION SYSTEM

BACKGROUND

Power distribution systems may be installed on or near a rack of servers or other electrical equipment and provide electrical power to various components within the rack. Although multiple outlets may be provided by the power distribution system, such as outlets for alternating current (AC) or direct current (DC), a number of devices installed within a rack may change over time. For example, a newly installed rack for a cloud storage server may have only one rack-mounted processor and one rack-mounted data storage unit that each need two outlets (i.e., for redundant power supplies) for four total outlets, but as a number of users of the cloud storage server grows, additional rack-mounted data storage units may be added. In some cases, a single, first power strip provides a sufficient number of outlets but may be expanded by plugging a second power strip into the first power strip, but this approach introduces additional lengths of cable (i.e., at least a cable for the second power strip) that may quickly crowd a rack storage space, especially when doors and panels are installed on the rack (e.g., to provide improved airflow for cooling of the components within the rack). Moreover, using an existing outlet for the second power strip may require temporarily unplugging an existing component to free up the outlet for the second power strip.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure are directed to a power distribution system having connectable modules.

In one aspect, a power distribution system is provided. The power distribution system comprises a plurality of connectable modules, including an input module and at least a first output module. The input module comprises a power input interface configured to receive alternating current (AC) power and direct current (DC) power from one or more external sources. The input module further comprises an output controller configured to generate control signals that control power delivery by the first output module. The input module further comprises an output module interface having i) a power output interface that provides AC power and DC power to the first output module, and ii) a control interface that provides the control signals to the first output module for controlling the power delivery. The first output module comprises an input module interface configured to engage the output module interface of the input module and receive the AC power and the DC power from the power output interface. The first output module further comprises two or more outlets, each configured to deliver either the AC power or the DC power.

In another aspect, a power distribution system is provided. The power distribution system comprises a plurality of connectable modules arranged end to end to form a daisy chain, the plurality of connectable modules including an input module and at least a first output module. The input module comprises a power input interface, a surge protector, and a power output interface. The first output module comprises an input module interface and two or more outlets. The power input interface receives electrical power from an external source and provides the electrical power to the surge protector. The surge protector regulates a voltage level of the electrical power and provides the regulated electrical power to the power output interface. The input module interface physically engages the power output interface and provides the regulated electrical power to the two or more outlets.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS/FIGURES

Non-limiting and non-exhaustive examples are described with reference to the following Figures.

FIG. 3A shows a diagram of example output modules and an interface coupler, according to an example embodiment.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

The present disclosure describes various examples of a power distribution system having connectable modules that are configured to plug into one another and transfer electrical power. In addition to providing a path for electrical power between the modules, the power distribution system includes an output controller that may control power delivery by the modules. Each module includes an output module interface configured to engage another module, for example, by an input module interface of the other module. The module interfaces are configured to transfer both electrical power and control signals from the output controller so that additional modules may be added to the system and also controlled.

Figure 1:
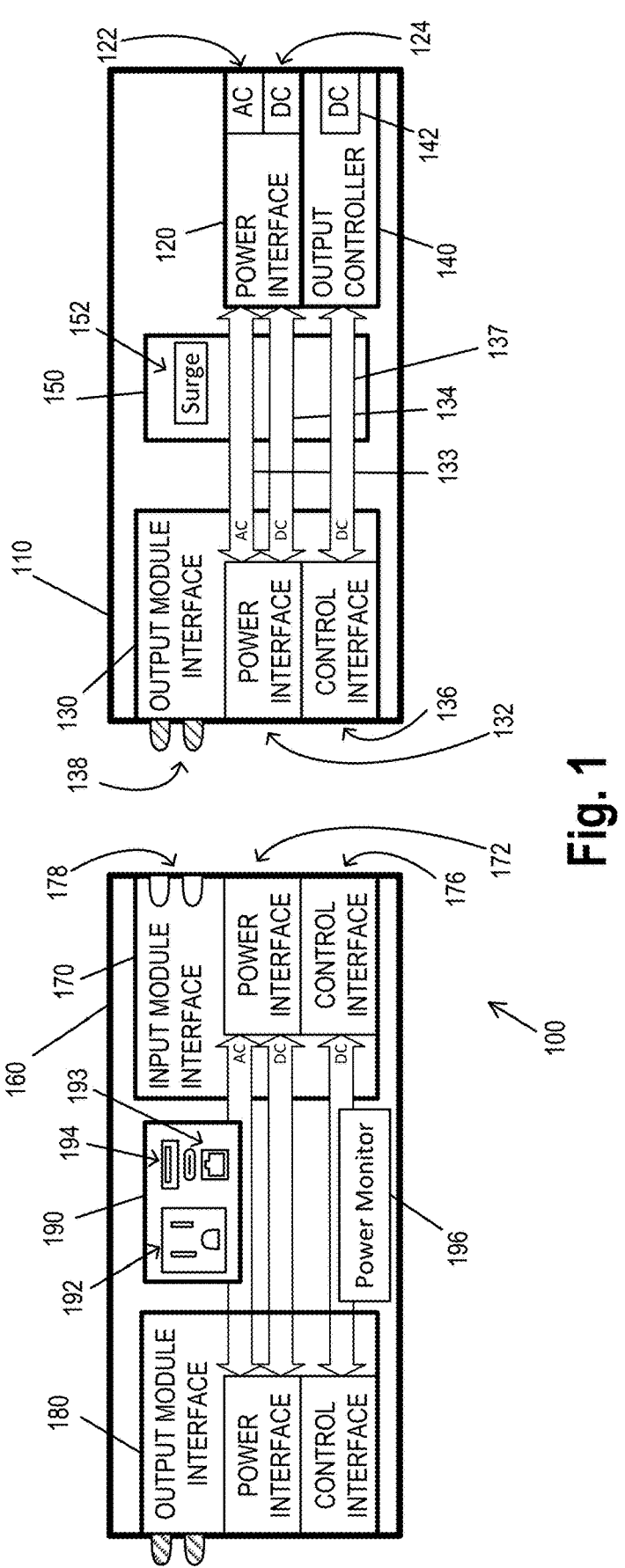
FIG. 1 shows a block diagram of an example of a power distribution system, according to an example embodiment.

This and many further embodiments for a computing device are described herein. For instance, FIG. 1 shows a block diagram of an example of a power distribution system 100, according to an example embodiment. The power distribution system comprises a plurality of connectable modules, including an input module 110 and at least a first output module 160. Generally, the connectable modules are configured to engage one another in a linear manner to form a daisy chain, starting with an input module and followed by one, two, three, or more output modules of varying types. Once engaged, electrical power received by the input module is provided to an adjacent output module, which in turn provides electrical power to subsequent output modules. Data and control signals are also provided in a similar manner. Advantageously, additional output modules may be attached to an end of the daisy chain, in other words, onto a last output module of the daisy chain. Notably, although the connectable modules are physically connected to one another to form the daisy chain, electrical connections between the modules may be coupled in series or in parallel, in various embodiments. In this way, a short circuit or other defect in one module does not necessarily stop power delivery to other modules in the daisy chain (e.g., downstream modules within the chain).

Figure 2:
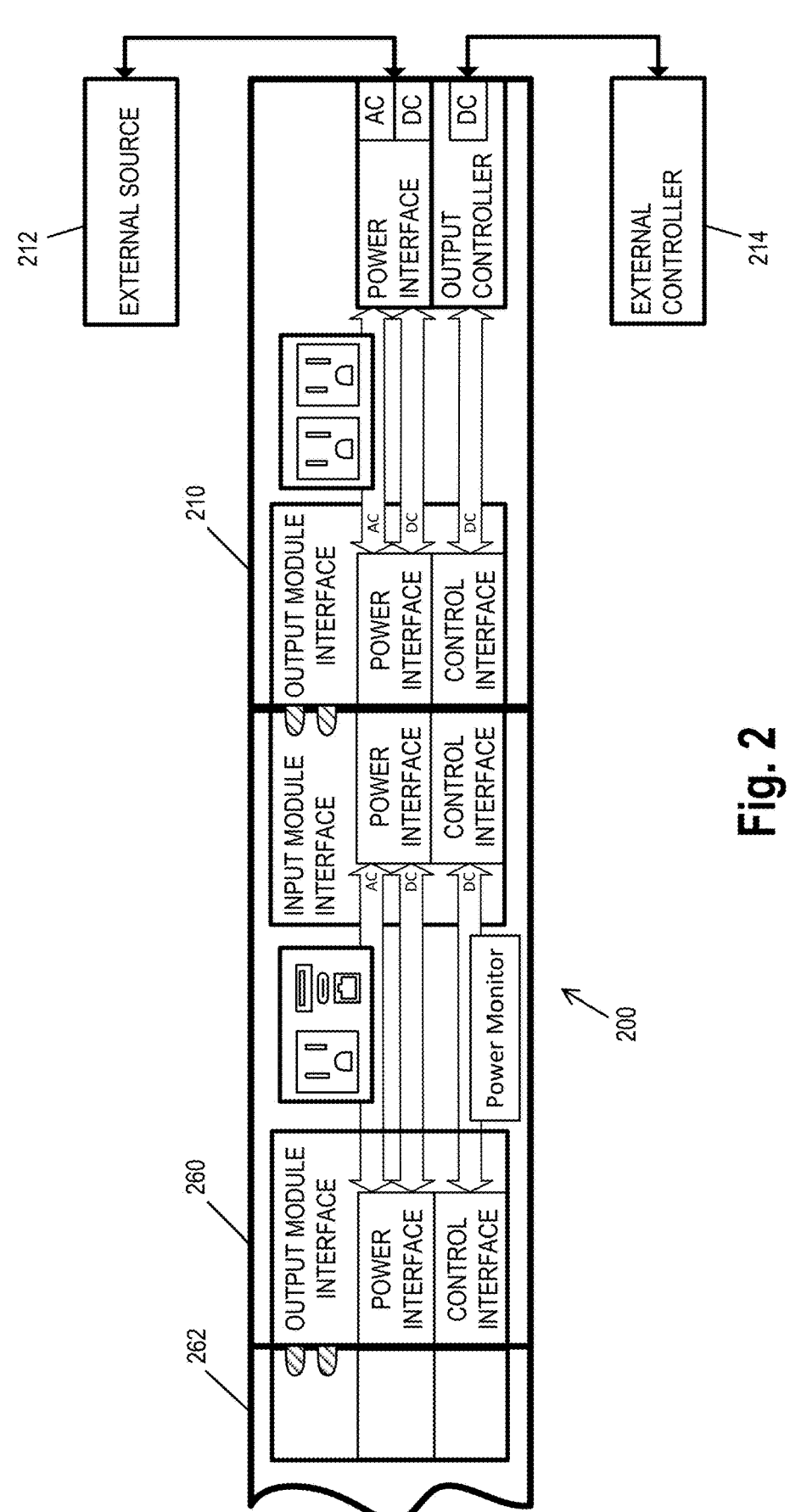
FIG. 2 shows a block diagram of an example of connected modules of a power distribution system, according to an example embodiment.

The input module 110 comprises a power input interface 120 configured to receive alternating current (AC) power and direct current (DC) power from one or more external sources, such as external source 212 (FIG. 2). The external source 212 may be a standalone power supply, residential or commercial wall outlet (i.e., an outlet coupled to AC mains or utility power), a power supply of an adjacent electronic device (e.g., a personal computer, server, etc.), or other suitable source of electrical power. In some examples, a single instance of the external source 212 provides AC power (e.g., one or more of 110V, 220V, etc.) and DC power (e.g., 5V, 12V, etc.). In other examples multiple instances of the external source 212 are coupled with the input module 110. In one such example, a first instance provides AC power and a second, separate instance provides DC power. In another example, a first instance provides AC power at 120V, a second instance provides DC power at 5V, and a third instance provides DC power at 12V. The power input interface 120 comprises one or more AC ports 122 and DC ports 124 for receiving the AC power and/or DC power and may include any suitable number of electrical contacts for hot, neutral, ground, etc. and may be implemented using any suitable plug, socket, receptacle, or other electrical interface. In some examples, the ports 122 and/or 124 have integral power cords compatible with National Electrical Manufacturers Association (NEMA) 5-15-P, International Electrotechnical Commission (IEC)/TR 60083, etc. In some examples, the AC ports 122 are one of an IEC C14 (15 Amp) or an IEC C20 (20 Amp) inlet plug.

The input module 110 further comprises an output module interface 130 having i) a power output interface 132 that provides AC power and DC power (e.g., to another output module), and ii) a control interface 136 that provides control signals, described below. The power output interface 132 is electrically coupled with the power input interface 120 to receive the AC power and DC power (e.g., from the external source 212), for example, via one or more AC lines 133 and one or more DC lines 134. The power output interface 132 has two, three, or more electrical contacts that provide the AC power and/or DC power to an adjacent output module, such as the output module 160, described in more detail below.

In some examples, the AC lines 133 and/or DC lines 134 may also be electrically coupled with an optional circuitry module 150 of the input module 110, where the circuitry module 150 includes one or more modules for conditioning, regulating, or otherwise processing the AC power or DC power from the power interface 120. In one example, the circuitry module 150 includes a surge protector 152 or suitable circuitry configured to protect against voltage spikes. For example, the surge protector 152 regulates a voltage level of the electrical power from the power interface 120 and provides regulated electrical power to the power output interface 132. The regulated electrical power may then be provided to downstream output modules via corresponding outlets 192.

In still other examples, the circuitry module 150 includes a power conditioner configured to improve power quality of the AC power received from the power interface 120, a noise filter, voltage regulator, or other suitable electrical module. In another example, the circuitry module includes an outlet module (not shown) for providing one or more of AC power, DC power, or data via electrical outlets. The outlets may be compliant with NEMA 5-15-R, NEMA 1-15-R, IEC 60320 C13, or other suitable outlet standards, in various embodiments. Generally, the outlets are wired in parallel with the AC lines 133 and/or DC lines 134. In some examples, the circuitry module 150 includes one or more data ports, such as Ethernet, or combined data and power ports, such as Universal Serial Bus (USB) ports or Power over Ethernet (PoE) ports. In these examples, the circuitry module 150 may be coupled with both the power input interface 120 (for power) and the output controller 140 (for data).

The input module 110 further comprises an output controller 140 configured to generate control signals that control power delivery by output modules connected with the input module 110, either directly or via one or more intermediary output modules. In some examples, the output controller 140 monitors power usage of devices connected to the power distribution system 100 (e.g., via the outlets 152) and provides feedback to an external controller, such as external controller 214 (FIG. 2), via a DC control port 142. In some examples, the output controller 140 receives control signals from the external controller 214 and relays or forwards the control signals to the output modules 160, via the control interface 136 and DC control line 137. In some examples, the output controller 140 comprises one or more user interface elements, such as switches or buttons with which a user may interact, and the output controller 140 generates control signals based on settings of the user interface elements. The output controller 140 may also include lights, LEDs, or other suitable indicators for providing status or diagnostic information.

In some embodiments, the input module 110 further comprises structural elements 138 that are configured to align the input module 110 and the output module 160 for coupling of the power output interface 132 and a corresponding power input interface 172 of the output module 160, as described below.

The output module 160 comprises an input module interface 170 configured to engage the output module interface 130 and receive the AC power and the DC power from the power output interface 132. The input module interface 170 comprises a power input interface 172 for transferring AC power and DC power and a control interface 176 for transferring control signals. Generally, the power input interface 172 has electrical contacts that are complementary to the electrical contacts of the power output interface 132 of the output module interface 130. In some examples, the power input interface 172 and the power output interface 132 each have five electrical contacts, three for AC (i.e., hot, neutral, and ground) and two for DC (supply voltage and ground). Examples of the complementary electrical contacts for the power input interface 172 and the power output interface 132 include plugs and sockets, blades and slots, or other suitable contacts. In some examples, a shape or structure of the complementary electrical contacts prevents improper engagement of the electrical contacts, similarly to having a polarized two-blade plug with one blade larger than another and one slot larger than another. In some examples, the control interface 176 is configured to provide electrical power and ground as well as data.

The input module interface 170 comprises structural elements 178 that are configured to align the input module 110 and the output module 160 for coupling of the power output interface 132 and the power input interface 172. In other words, the input module interface 170 physically engages the power output interface 130 (via the output module interface 130), which is facilitated by the structural elements 138 and 178. Generally, the structural elements 178 are complementary to the structural elements 138. Examples of the structural elements 138 and structural elements 178 include tabs and slots, posts and recesses, etc. In the example shown in FIG. 1, the structural elements 138 include two posts having a conical or "bullet-nose" shape that facilitate insertion, even without direct visibility, into two corresponding recesses as the structural elements 178. In some examples, the structural elements 138 and/or structural elements 178 are configured to prevent coupling of incompatible modules, for example, to prevent a module configured for 15 Amps of maximum current from being coupled with a module configured for 20 Amps of maximum current.

The output module 160 further comprises one or more output ports 190 configured to deliver one or more of AC power, DC power, or data. In some examples, AC power is provided via NEMA 5-15-R, NEMA 1-15-R, or other suitable outlets 192 or receptacles for receiving a corresponding power plug from a server, network attached storage device, or other electrical device. In some examples, the DC power is provided via a three-pin 2510 interface (e.g., 12V, Ground, fan speed), four-pin Molex interface (e.g., 12V with Ground, 5V with Ground), or other suitable interface (not shown). In some examples, the output ports 190 include one or more data ports, such as Ethernet port 194, or combined data and power ports, such as Universal Serial Bus (USB) ports 193, Power over Ethernet (PoE) ports (not shown), or other suitable ports. In these examples, the output port 190 may be coupled with one or both of the power input interface 172 (for power) and the control interface 176 (for data).

The control interface 176 receives control signals generated by the output controller 140, or relayed from the external controller 214, in various embodiments and/or scenarios. In some examples, the control interface 176 is configured to adjust power delivery from the outlets 192, for example, by enabling or disabling power, changing voltage levels, limiting current draw, or other suitable adjustments. In one such example, the control interface 176 includes a relay for disabling power delivery from an outlet 192, for example, by breaking a hot connection for AC power. In some examples, the control interface 176 includes opto-isolators or other suitable isolation circuits configured to prevent an energy surge or spike from damaging other components within the power distribution system 100. In some examples, the control interface 176 also includes a controller configured to monitor the output ports 190, for example, to monitor current draw, voltage levels, etc. and provide feedback to the output controller 140. For example, the controller of the control interface 176 may monitor current draw by the outlet 192 and provide feedback that indicates when the outlet is close to reaching a threshold, such as a 15 amp or 20 amp fuse threshold, or a portion thereof. In some examples, the threshold is a divided portion of a 20 amp threshold according to a number and current capacity of the output ports 190. For example, a USB port may be allocated 2 amps out of 4 amps for DC power, while an AC port might be allocated 5 amps out of 15 amps for AC power.

In some examples, the input module interface 170 comprises a power monitor 196 configured to monitor various electrical characteristics, such as voltage, current, power, or other suitable characteristics of electrical power provided by the output ports 190. The power monitor 196 may be implemented as circuitry, software running on a processor and memory, or a combination thereof. In some examples where the output ports 190 provide data transmission (e.g., Ethernet or USB), the power monitor 196 is further configured to monitor data transmission characteristics, such as a number of packets transmitted, packet loss, or other suitable characteristics. The power monitor 196 may be configured to transmit information about the electrical characteristics and/or data transmission characteristics via the control interface 176, for example. In some examples, the power monitor 196 provides information to the power monitor 196 of an upstream output module in the daisy chain, which in turn provides the information to the output controller 140. In other examples, each power monitor 196 of the output modules within a daisy chain communicates separately with the output controller 140.

The output module 160 also comprises an output module interface 180 that generally corresponds to the output module interface 130. In other words, the output module 160 includes its own instances of the power output interface 132, the control interface 136, and the structural elements 138. Accordingly, one or more instances of the output module 160 may engage one another in a linear manner to form a daisy chain. In this way, the AC power and/or DC power from the power input interface 120 may be provided through the power distribution system 100 from the input module 110 through one or more output modules. Moreover, additional output modules 160 may be added onto an existing daisy chain of modules, with power and control signals also extended through the additional modules.

FIG. 2 shows a block diagram of an example of connected modules of a power distribution system 200, according to an example embodiment. The power distribution system 200 comprises a plurality of connectable modules, including an input module 210, a first output module 260, and a second output module 262. The input module 210 generally corresponds to the input module 110 and is coupled to an external source 212 for power and an external controller 214 for control signals. The first output module 260 and the second output module 262 generally correspond to the output module 160, with the first output module 260 being engaged with the input module 210 and the second output module 262 being engaged with the first output module 260. AC power and DC power provided by the external source 212 is accessible from the outlets of the input module 210 (e.g., corresponding to outlets 152) and from the outlets of the output modules 260 and 262 (e.g., corresponding to outlets 192).

Figure 3B:
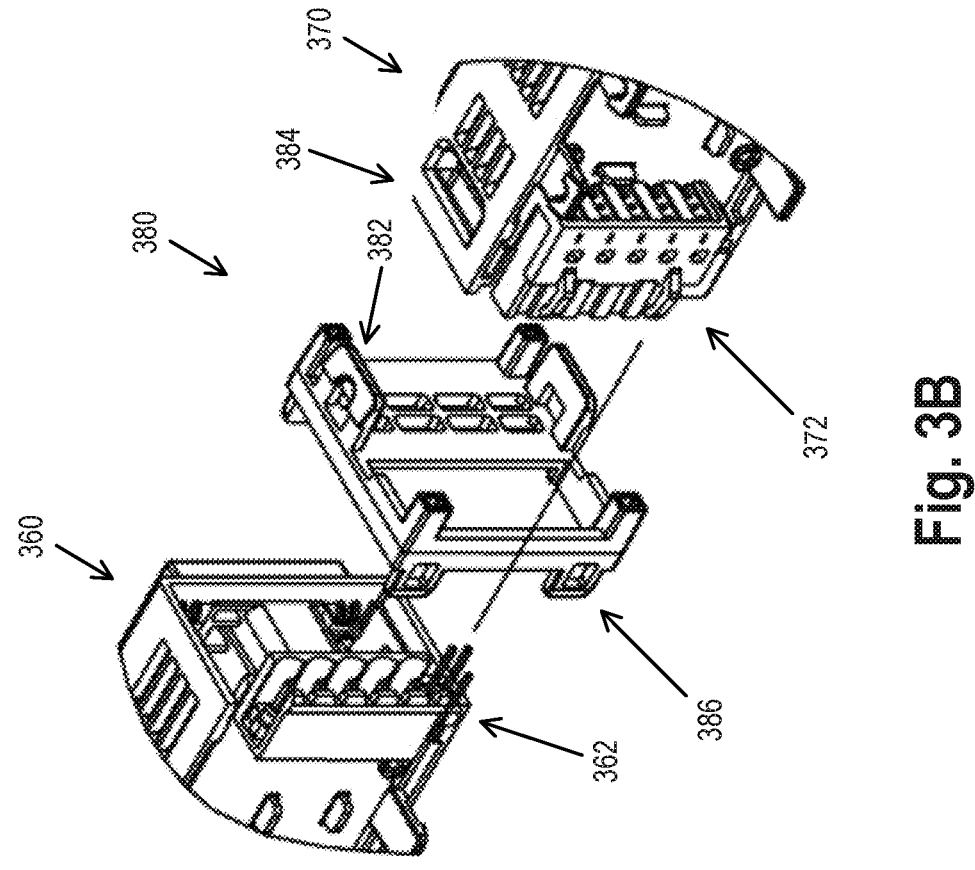
FIG. 3A shows a diagram of example output modules, according to an example embodiment.
Figure 3A:
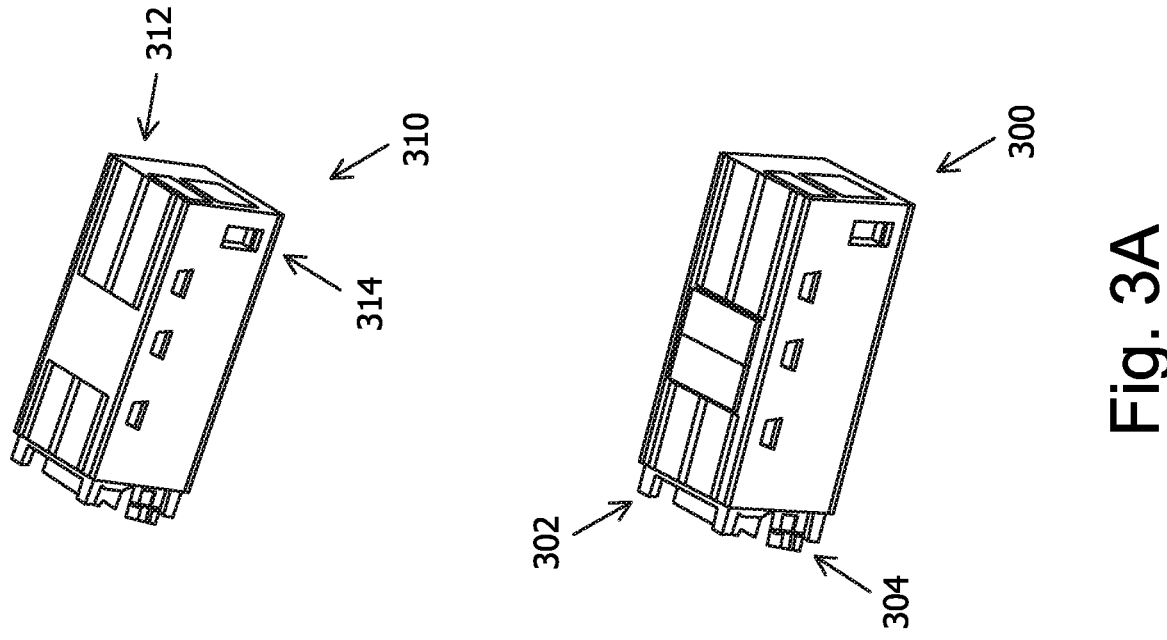

FIG. 3A shows a diagram of example output modules 300 and 310, according to an example embodiment. The output modules 300 and 310 are generally similar to the output module 160. In the example shown in FIG. 3A, the output module 300 comprises posts, protrusions or other projecting structures 302 as structural elements for aligning and engaging the output modules 300 and 310. The posts 302 may be inserted into corresponding recesses or mating structures 312 of the output module 310. The output module 300 may further comprise a tab 304 as a structural element for securing the output modules 300 and 310 together. The tab 304 may be inserted into a corresponding recess 314 of the output module 310. Generally, the posts 302, recesses 312, tab 304, and recess 314 are configured to enable a user to engage and disengage the output modules 300 and 310 from each other without the use of tools. The posts and recesses are also arranged so as to prevent incompatible modules from being plugged into each other or modules plugged into each other in the wrong manner (e.g., upside down).

FIG. 3B shows a diagram of example output modules 360 and 370 and an interface coupler 380, according to an example embodiment. The output modules 360 and 370 are generally similar to the output module 160, but are further configured to engage the interface coupler 380 instead of each other. In other words, the output module 360 engages a first side of the interface coupler 380 and the output module 370 engages an opposing, second side of the interface coupler 380. The output module 360 comprises an electrical connector 362, generally corresponding to the power output interface 132 and the control interface 136, while the output module 370 comprises an electrical connector 372, generally corresponding to the power input interface 172 and the control interface 176.

In the example shown in FIG. 3B, functionality of the structural elements 138 and 178 is provided, at least in part, by the interface coupler 380. Specifically, the interface coupler 380 comprises one or more tabs 382 each configured to engage a slot 384 of the output module 370 to secure the output module 370 with the interface coupler 380. The tabs 382 may include lips that engage with an edge of the corresponding slot to provide a securing feature. Displacement of the tab when it is in the slot disengages the lip from the slot edge so as to permit removal of the coupler from the module. Similarly, the interface coupler 380 comprises a tab 386 having a lip configured to engage a housing of the electrical connector 362 to secure the output module 360 with the interface coupler 380. In this example, protruding structural elements are omitted from the output modules themselves, which reduces a likelihood of cords or cables becoming entangled in the structural elements.

Figure 4:
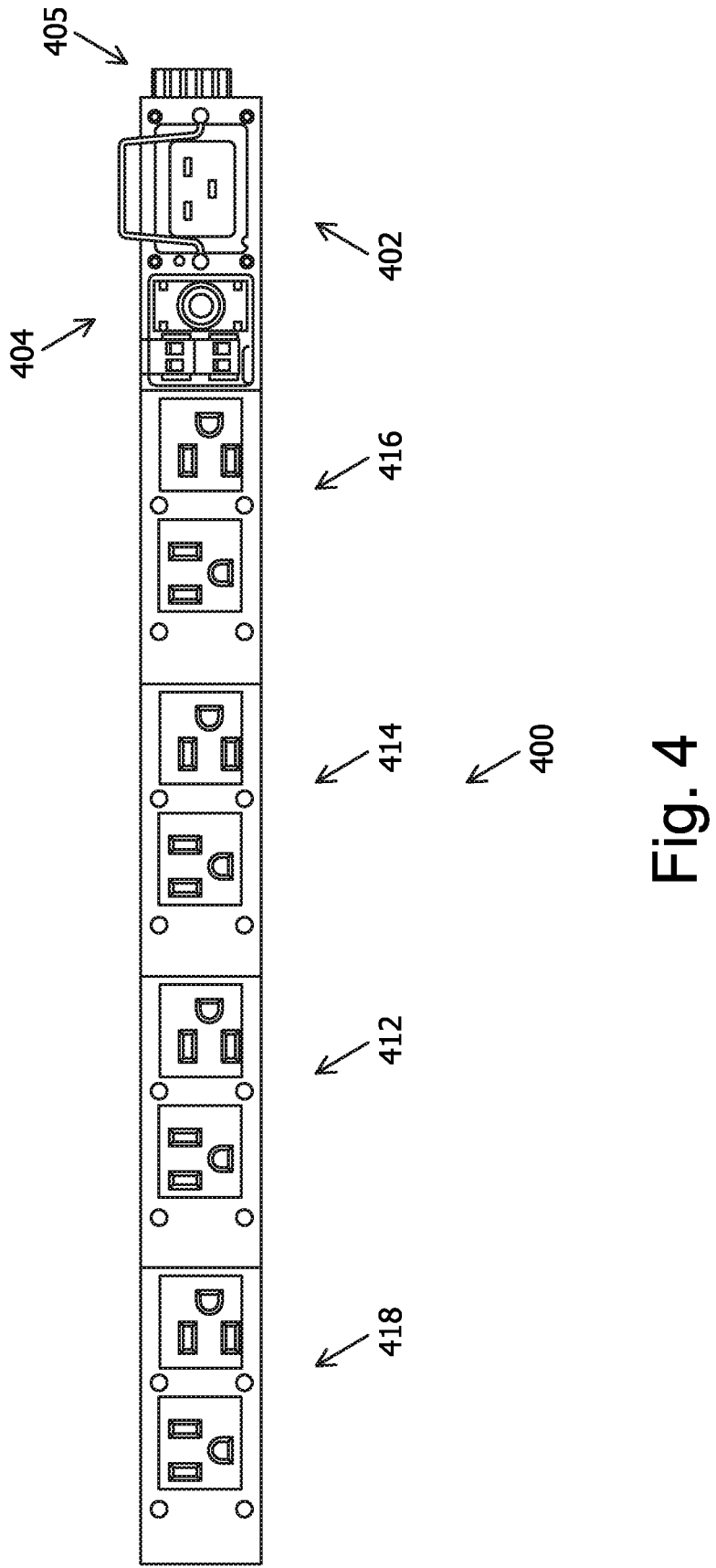
FIG. 4 shows a block diagram of an example of connected modules of a power distribution system, according to an example embodiment.

FIG. 4 shows a block diagram of an example of connected modules of a power distribution system 400, according to an example embodiment. The power distribution system 400 comprises an input module 402 and output modules 412, 414, 416, and 418 arranged in a daisy chain configuration. The input module 402 generally corresponds to the input module 410 and further comprises user interface elements 404, such as switches and LEDs for providing power delivery status (e.g., green lights when power delivery is enabled, red lights when power delivery is disabled). Although not shown, it is also contemplated that a light source, such as LEDs, could be included on each module so as to provide a visual indication that power is being provided to each module (thus, providing a visual check of faulty connections between modules.) The output modules 412, 414, 416, and 418 generally correspond to the output module 160. Accordingly, an output controller of the input module 402 (e.g., output controller 140) is configured to control power delivery from outlets of the output modules 412, 414, 416, and 418. Moreover, the output controller of the input module 402 may receive instructions for power delivery control from an external controller (not shown) via a control port 405 (e.g., control port 142) and to send power consumption data to the external controller.

The description and illustration of one or more aspects provided in this application are not intended to limit or restrict the scope of the disclosure as claimed in any way.

The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A power distribution system comprising:
a plurality of connectable modules, including an input module and at least a first output module;
wherein the input module comprises
a power input interface configured to receive alternating current (AC) power and direct current (DC) power from one or more external sources,
an output controller configured to generate control signals that control power delivery by the first output module, and
an output module interface having i) a power output interface that provides AC power and DC power to the first output module, and ii) a control interface that provides the control signals to the first output module for controlling the power delivery;
wherein the first output module comprises
an input module interface configured to engage the output module interface of the input module and receive the AC power and the DC power from the power output interface, and
two or more outlets, each configured to deliver either the AC power or the DC power;
wherein the input module comprises a circuitry module configured to regulate and/or condition the AC power; and
wherein the circuitry module comprises a surge protector configured to protect the first output module against voltage spikes in the received AC power.
2. A power distribution system comprising:
a plurality of connectable modules, including an input module and at least a first output module;
wherein the input module comprises
a power input interface configured to receive alternating current (AC) power and direct current (DC) power from one or more external sources,
an output controller configured to generate control signals that control power delivery by the first output module, and
an output module interface having i) a power output interface that provides AC power and DC power to the first output module, and ii) a control interface that provides the control signals to the first output module for controlling the power delivery;
wherein the first output module comprises
an input module interface configured to engage the output module interface of the input module and receive the AC power and the DC power from the power output interface, and
two or more outlets, each configured to deliver either the AC power or the DC power;

wherein the plurality of connectable modules are arranged end to end to form a daisy chain;

wherein the input module includes a surge protector;

wherein the power input interface provides the electrical power to the surge protector;

wherein the surge protector regulates a voltage level of the electrical power and provides regulated electrical power to the power output interface; and wherein the input module interface physically engages the power output interface and provides the regulated electrical power to the two or more outlets.

3. The power distribution system of claim 2, wherein the daisy chain extends linearly.

4. The power distribution system of claim 3, wherein the first output module comprises a power monitor configured to monitor one or more electrical characteristics of electrical power provided by the two or more outlets and to provide information based on the one or more electrical characteristics to the output controller; and wherein the output controller generates the control signals based on the provided information.

5. The power distribution system of claim 4, wherein the first output module comprises one or more first structural elements and the input module comprises one or more second structural elements; and wherein the one or more first structural elements and the one or more second structural elements are complementary and configured to align the input module and the first output module for coupling of the input module interface and the power output interface.

6. The power distribution system of claim 2, wherein the first output module comprises one or more first structural elements and the input module comprises one or more second structural elements; and wherein the one or more first structural elements and the one or more second structural elements are complementary and configured to align the input module and the first output module for coupling of the input module interface and the power output interface.

7. The power distribution system of claim 1, wherein the two or more outlets comprises a first outlet providing AC power via an AC line and a second outlet providing DC power via a DC line, the AC line being separate from the DC line.

8. The power distribution system of claim 1, wherein a common ground is electrically connected throughout the plurality of connectable modules.

9. The power distribution system of claim 1, wherein:

the plurality of connectable modules further comprises a second output module;

the output module interface is a first output module interface and the input module interface is a first input module interface;

the first output module interface of the input module is configured to engage the first input module interface of the first output module; and the first output module comprises a second output module interface configured to engage a second input module interface of the second output module.

10. The power distribution system of claim 9, wherein the output controller is configured to control power delivery from the two or more outlets of the first output module and two or more outlets of the second output module.

11. The power distribution system of claim 10, wherein the output controller is configured to receive instructions for power delivery control from an external controller via a control port and to send power consumption data to the external controller.

12. The power distribution system of claim 10, wherein:

the two or more outlets of the first output module are wired in parallel with the second output module interface; and the two or more outlets of the second output module are wired in parallel with a third output module interface of the second output module.

13. The power distribution system of claim 1, wherein the one or more first structural elements and the one or more second structural elements are complementary and mate with one another to physically couple the input module and the first output module.

14. The power distribution system of claim 13, wherein:

the plurality of connectable modules further comprises a second output module;

the output module interface is a first output module interface and the input module interface is a first input module interface;

the first output module interface of the input module is configured to engage the first input module interface of the first output module;

the first output module comprises a second output module interface configured to engage a second input module interface of the second output module;

the second output module interface comprises one or more third structural elements and the second input module interface comprises one or more fourth structural elements; and the one or more third structural elements and the one or more fourth structural elements are complementary and configured to align the first output module and the second output module for coupling of a power output interface of the first output module and a power input interface of the second output module.

15. The power distribution system of claim 14, wherein:

the power input interface of the first output module and the power output interface of the first output module are located at opposing ends of the first output module; and the power input interface of the second output module and the power output interface of the second output module are located at opposing ends of the second output module.

16. The power distribution system of claim 15, wherein:

the plurality of connectable modules further comprises one or more third output modules; and respective input module interfaces of the output modules of the plurality of connectable modules are configured to engage respective output module interfaces of the output modules or the input module.

17. The power distribution system of claim 1, wherein the power distribution system further comprises one or more interface adapters that each have a first side and a second side and physically couple the input module to the first side and one of the one or more output modules to the second side so as to electrically couple the output module interface of the input module to respective input module interfaces of one or more output modules of the plurality of connectable modules.

18. The power distribution system of claim 1, wherein the output controller generates the control signals based on one or more user interface elements of the input module.

19. The power distribution system of claim 1, wherein the first output module comprises a power monitor configured to monitor one or more electrical characteristics of electrical power provided by the two or more outlets.

20. The power distribution system of claim 19, wherein the power monitor is configured to provide information based on the one or more electrical characteristics to the output controller.

\* \* \* \* \*